United States Patent [19]

Hill

[11] 4,180,815
[45] Dec. 25, 1979

[54] RADIO IDENTIFICATION SYSTEMS

[75] Inventor: Orvin G. Hill, Malvern, England

[73] Assignee: The Secretary of State for Defence in her Britannic Majesty's Government of the United Kingdom of Great Britain and Northern Ireland, United Kingdom

[21] Appl. No.: 871,002

[22] Filed: Jan. 20, 1978

[30] Foreign Application Priority Data

Jan. 24, 1977 [GB] United Kingdom ............... 2751/77

[51] Int. Cl.² .................................... G01S 9/56
[52] U.S. Cl. .................................... 343/6.5 R
[58] Field of Search ............... 343/6 R, 6.5 R, 6.5 LC

[56] References Cited

U.S. PATENT DOCUMENTS 3,801,980   4/1974   Danton et al. .............. 343/6.5 LC

FOREIGN PATENT DOCUMENTS 2005460   8/1971   Fed. Rep. of Germany ....... 343/6.5 R

*Primary Examiner*—T. H. Tubbesing
*Attorney, Agent, or Firm*—Cushman, Darby and Cushman

[57] ABSTRACT

To enable a transponder in a radio identification system, such as a secondary surveillance radar system, to remain responsive to a new interrogating signal received while it is processing a previously received interrogating signal, the transponder is provided with storage means arranged to store the new interrogating signal until the previously received interrogating signal has been processed. In a preferred arrangement, the transponder also includes variable delay means arranged to delay the transmission of a reply signal to each received interrogation by a variable amount inversely dependent upon the length of any delay introduced by the storage means so that the aggregate of the variable delay and the storage delay is constant for all received interrogating signals. With a knowledge of the fixed overall delay between the reception of an interrogating signal by the transponder, and the transmission of a reply signal in response thereto, the conventional practice of determining the identity and position of a target carrying the transponder, by associating the reply signal with primary radar returns received from the target, can still be used.

8 Claims, 2 Drawing Figures

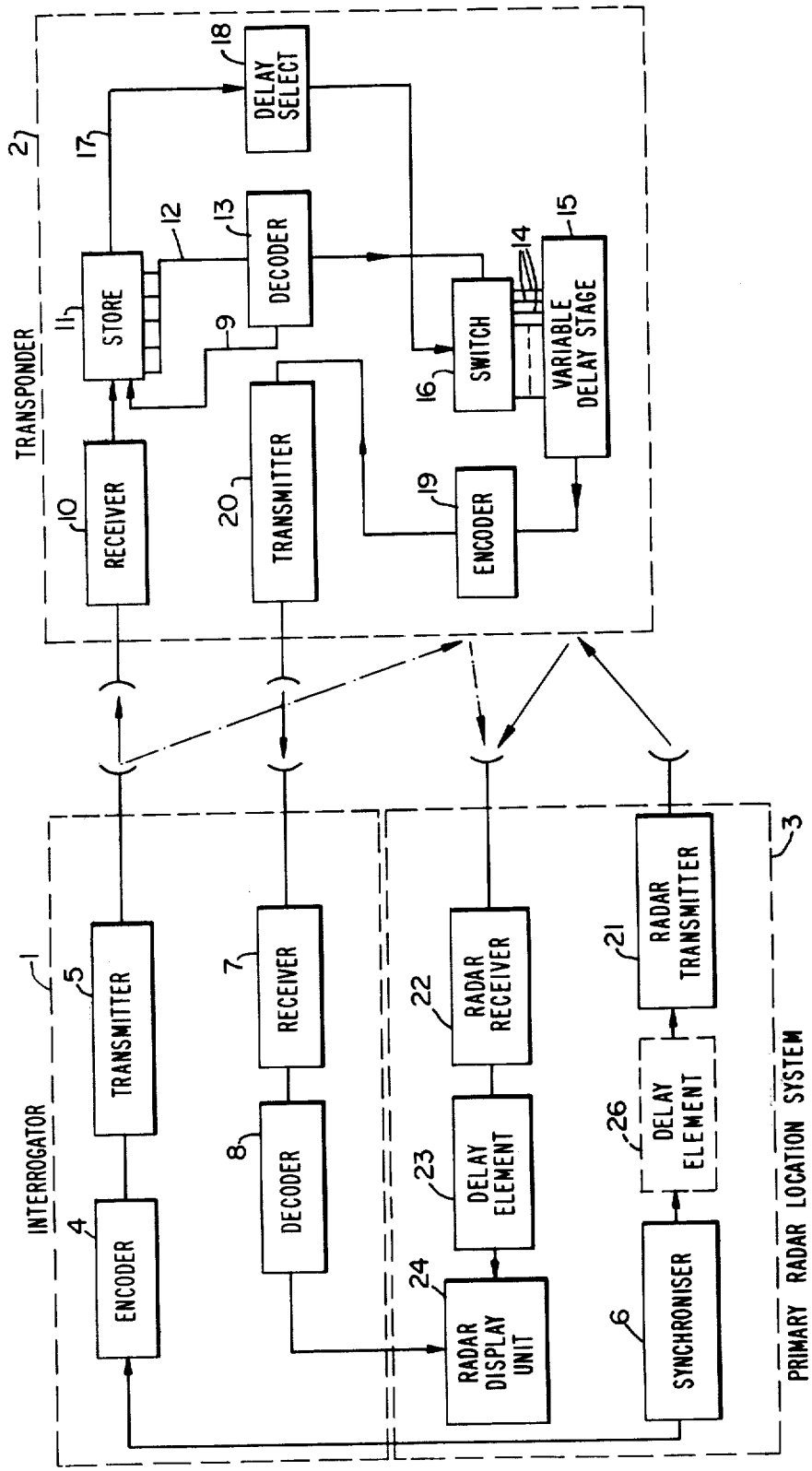

RADIO IDENTIFICATION SYSTEMS

This invention relates to radio identification systems.

Radio identification systems are commonly employed as Secondary Surveillance Radar (SSR) systems for identifying moving targets, for example aircraft in air traffic control. In such systems each aircraft carries a responder transmitter called a transponder, and an interrogation station wishing to identify an aircraft carrying a transponder, transmits an interrogating signal towards the aircraft. The transponder carried by the aircraft receives the interrogating signal, decodes it and then generates and transmits an identifying reply signal back to the transmitter.

While the transponder is occupied in processing this particular interrogating signal, i.e. during the period between reception of the interrogating signal and the transmisson of the reply signal, the transponder is unable to deal with interrogations received from other interrogating stations and will therefore not respond to them. In some applications, this period of transponder occupancy can be relatively long, increasing the probability that replies will not be made.

The problem is aggravated by the tendency for interrogating stations to operate at approximately the same pulse repetition frequency, often running at, or nearly in synchronism. In such cases if an interrogation is received from an interrogation station while the transponder is occupied the probability that the transponder will be occupied for subsequent interrogations from that station is considerably increased and in the worst case, it is possible that interrogating signals from a particular interrogating station will never generate any reply from a particular aircraft because its transponder is always occupied at the appropriate times by another interrogating station.

It is an object of the present invention to provide means for enabling a transponder in a radio identification system to remain responsive to an interrogating signal received while it is processing or replying to a previously received interrogating signal.

According to the present invention a transponder for use in a radio identification system includes storage means for temporarily storing a new interrogating signal received whilst the transponder is occupied in processing a previously received interrogating signal, at least until the transponder is capable of independently processing said new interrogating signal.

The storage means is preferably capable of storing a plurality of new interrogating signals received while the transponder is occupied in processing a previously received interrogating signal, the stored new interrogating signals preferably being subsequently processed in the order in which they were received by the transponder.

Preferably the transponder is arranged to introduce a fixed overall time delay between the reception of any interrogating signal and the transmisson of a reply signal in response thereto irrespective of the length of any delay introduced by storage of the interrogating signal in the storage means. Thus, with a knowledge of this fixed overal time delay, information regarding the position of a target carrying the transponder can be obtained, for example by correlating the reply signal with a primary radar return signal derived from a simultaneously transmitted primary radar signal.

For this purpose the transponder may include variable delay means arranged to delay the transmission of the reply signal to each received interrogating signal in addition to any delay introduced by storage, the additional delay being inversely dependent upon the length of any said delay introduced by storage so that the aggregate of the storage delay and this variable delay is constant for all received interrogating signals. Thus the longer an interrogating signal is stored in said storage means, the shorter will be the delay applied by the variable delay means.

According to a second aspect of the invention a radio identification system, including at least one transponder of the above kind arranged to introduce a fixed overall time delay between the reception of any interrogating signal and the transmission of a reply signal in response thereto, is combined with a primary radar location system including a radar receiver for receiving a primary radar return signal from a target carrying the transponder in response to a transmitted radar signal which may be constituted by the said interrogating signal, or separately transmitted in synchronism therewith, and means for delaying the primary radar return signal received from said target by an amount equal or corresponding to, said fixed overall time delay introduced by the transponder. This enables the delayed primary radar return signal to be made coincident with the reply signal from the transponder, and by associating the primary radar return signal with the transponder reply signal in this way, the position and identity of the responding target may be determined.

Alternatively, where the primary radar signal and the interrogating signal are transmitted separately, the transmisson of the primary radar signal may be delayed with respect to the transmission of the interrogating signal by an amount equal, or corresponding to the overall fixed time delay of the transponder. Again, by coordinating the reply signal from the transponder with the primary radar return signal, the identity and location of the target carrying the transponder can be determined. The primary radar return signal and the transponder reply signal may be received by a common receiver, or by separate receivers feeding a common display unit.

The invention will now be described in greater detail, by way of example only, with reference to the accompanying drawing which shows a block schematic diagram of a radio identification system combined with a primary radar location system in accordance with the second aspect of the invention.

The drawing shows a radio identification system, comprising an interrogator 1 and a transponder 2, in combination with a primary radar location system 3. The interrogator 1 is of known form comprising an interrogation code generator 4 triggered by a synchronising pulse from a synchroniser 6 and arranged to pulse an interrogation transmitter 5 in accordance with a predetermined pulse code pattern to transmit an interrogating signal.

The interrogator 1 also includes a receiver 7 for receiving a coded pulse reply signal generated by the transponder 2 in response to the interrogating signal, and a decoder 8 for decoding the transponder reply signal. The output of the decoder 8 is then applied to the primary radar location system 3 for a purpose which will be described below.

The transponder 2 comprises a receiver 10 for receiving interrogating signals transmitted by the interrogator 1, which interrogating signals are applied in accordance with the invention to a store 11. The store includes a number of shift registers (not shown) each capable of storing an interrogating signal and each individually associated with a counter (not shown) arranged to start counting as soon as the associated shift register is occupied by an interrogating signal. The output of each shift register in the store 11 is connected by means of a channel 12 to a decoder 13. When the latter becomes free as indicated by a 'decoder free' signal along path 9 the coded interrogating signal stored in the shift register associated with the counter having the highest count, is fed to it and the decoder then decodes the interrogating signal to produce an output signal upon recognition of a particular pulse code pattern in the interrogating signal applied to it.

The output of the decoder 13 is connected to a delay stage 15 via a selection switch 16 for selecting one of a plurality of input tapping points 14 of the delay stage to which the decoder output is applied. In this way the delay applied to the interrogating signal by the delay stage is controllable. Upon transfer of the interrogating signal from the appropriate shift register in the store 11 to the decoder 13, the count on the associated counter is applied along channel 17 to a delay selection circuit 18.

The output of the delay selection circuit 18 is applied to the switch 16 for selecting, in dependence upon the count on this counter, the appropriate input tapping point 14 of the delay stage 15 required to bring the sum of the delay period introduced by storage of the interrogation signal in the storage means 11 and the delay period introduced by the delay stage 15 to the interrogating signal, up to a constant value. The higher the count on the associated counter in the store 11 the shorter the delay applied to the resultant decoder output signal by the delay stage 15.

The delayed decoder output signal emerging from the delay stage 15 is then applied to an encoder 19 arranged to pulse the reply signal transmitter 20 in accordance with a predetermined pulse code pattern in response to the decoder output. The decoder 13 may be capable of recognising a number of different interrogating signal pulse code patterns, whereby to cause the encoder 19 to generate a specifically coded reply signal in response to each one.

The primary radar location system 3 combined with the interrogator 1, includes a radar transmitter 21 arranged to transmit a pulsed primary radar signal in synchronism with the transmission of the interrogating signal by the interrogating transmitter 5, in response to a synchronising pulse from the synchroniser 6; and a radar receiver 22 for receiving primary radar return signals from the transmitted radar pulses. The output of the radar receiver 22 is applied via a delay element 23 to a radar display unit 24 to which the output of the interrogation decoder 8 is also applied for simultaneous display. The time delay introduced by the delay element 23 correspondends to the overall fixed time delay introduced by the transponder 2 between reception of an interrogation signal and transmission of a reply signal in response thereto.

In operation of the system, an interrogating signal and primary radar signal are simultaneously transmitted by the respective transmitters 5 and 21. The interrogating signal is received by the transponder receiver 10 and, if the decoder 13 is not occupied in processing a previously received interrogating signal, passes directly to the decoder 13 for processing.

However in accordance with the invention, if the decoder is occupied by a previously received interrogating signal, the new interrogating signal is fed to an empty shift register in the store 11, thereby initiating the count on the associated counter, and stored there until the processing of the interrogating signal currently being processed, and any of any other previously received signals, has been completed and the decoder becomes free.

The stored interrogating signal is then transferred to the decoder 13 and simultaneously the count on the associated counter is applied to the delay selection circuit 18 which selects by means of the switch 16 the input tapping point of the delay stage 15 to which the decoded interrogating signal from the decoder 13 must be applied in order to bring the overall delay period between the reception of the interrogating signal and the transmission of the reply signal thereto up to the above mentioned constant value.

In the case of interrogating signals received while the decoder 13 is unoccupied, to which a minimum delay is introduced by passage through the store 11 to the decoder 13, the decoder output is automatically applied to the input tapping point of the delay stage which will produce the maximum delay. This maximum time delay must necessarily exceed the time required to process the number of interrogating signals that the store 11 is capable of storing.

As mentioned above, the decoder 13 will respond only to received interrogating signals having particular pulse code patterns, in accordance with known practice, to produce an output signal which is then applied to the selected input tapping point 14 of of the delay stage 15. The delayed output signal from the delay stage 15 is applied to the encoder 19 which responds by pulsing the transponder transmitter 20 in accordance with a predetermined reply pulse code pattern.

The coded reply signal from the transponder is received by the interrogator receiver 7 and applied to the interrogator decoder 8 which produces an output signal upon recognition of the reply signal pulse code pattern. This signal is applied to the radar display unit 24 of the primary radar location system 3.

During the above interrogating process, return echoes of the primary radar signal transmitted simultaneously with the interrogating signal are received by the radar receiver 22, delayed in the delay element 23, and applied to the radar display unit 24 for display in conventional manner.

Because the delay applied to the received radar return signal by the delay element 23 is equal to the overall fixed delay introduced by the transponder, the timing of the transponder reply signal and the delayed radar returns from the target carried by the transponder will coincide at the display unit 24, and can therefore be superimposed on the display. This enables the location of the target carrying the transponder to be determined by association of the two received signals.

It will be seen that a transponder in accordance with the invention is capable of responding to interrogation signals received whilst occupied in processing a previously received interrogation signal. Furthermore, by ensuring that the transponder introduce a fixed time delay between the reception of an interrogating signal and the transmission of a reply signal thereto, the conventional practice of associating the received reply signal with the primary radar return from the target carrying the transponder to locate the target, may still be used. In this connection, the interrogating signal may also constitute the primary radar signal, (as illustrated by the chain-line transmission path between the transmitter 5 and the receiver 22) obviating the need for the separate primary transmitter 21 and synchroniser 6. Alternatively, where the two are separately transmitted, the transmission of the primary radar signal may be delayed with respect to the transmission of the interrogating signal. In such an arrangement, in place of the delay element 23, an appropriate delay element 26 (shown in broken lines) may be placed in the path between the synchroniser 6 and the radar transmitter 21, or on the output side of the transmitter 21.

It is not essential that this delay, whether introduced on transmission or on reception, is equal to the fixed delay introduced by the transponder, as the primary return and secondary reply signal from a particular target can still be correlated providing the delay duration is known. However, if they are not equal, the two signal traces when displayed on a display unit will appear at different positions separated by a distance corresponding to the difference between the two delay times.

Clearly the invention is not limited to aircraft SSR systems but may be used in connection with any other moving craft. In some applications the interrogator may be carried on the moving craft and used to identify other moving targets or fixed targets on the ground, for example.

What I claim is:

1. A transponder for use in a radio identification system comprising:
    a receiver for receiving interrogating signals transmitted from an interrogating station;
    processing means for processing the received interrogating signals to produce reply signals in response thereto;
    a transmitter for transmitting said reply signals;
    storage means for temporarily storing a new interrogating signal received while the processing means is occupied in processing a previously received interrogating signal, at least until the processing means is capable of independently processing the new interrogating signal; and
    variable delay means arranged to delay the transmission of the reply signal to each received interrogating signal by an amount inversely dependent upon the length of any delay introduced by storage of the interrogating signal in the said storage means, so that the overall delay between the reception of an interrogating signal and the transmission of a reply signal thereto is substantially constant for any interrogating signal.

2. A transponder according to claim 1 wherein said storage means includes means for storing a plurality of new interrogating signals received while said processing means is occupied in processing a previously received interrogating signal.

3. A radio identification system comprising an interrogating transmitter for transmitting an interrogation signal, at least one transponder as claimed in claim 2, responsive to said interrogating signal to transmit a reply signal in response thereto, and a receiver for receiving said reply signal from the transponder.

4. A radio identification system comprising an interrogating transmitter for transmitting an interrogating signal, at least one transponder as claimed in claim 1, responsive to said interrogating signal to transmit a reply signal in response thereto, and a receiver for receiving said reply signal from the transponder.

5. The combination of a radio identification system, included at least one transponder according to claim 1, with a primary radar location system including a radar receiver for receiving a primary radar return signal from a target carrying the transponder, in response to a transmitted radar signal, and means for delaying the primary radar return signal received from the target by an amount equal, or corresponding to the fixed overall time delay introduced by the transponder.

6. The combination according to claim 5, wherein the radio identification system includes a transmitter for transmitting an interrogating signal to which the transponder is responsive to transmit a reply signal, and wherein the primary radar receiver is responsive to the echo of said interrogating signal from the target carrying the transponder to derive said primary radar return signal.

7. The combination as claimed in claim 5, wherein the radio identification system and the primary radar location system each include a separate radar transmitter arranged respectively to transmit, in synchronism, the interrogating signal, and the transmitted radar signal from which the primary radar return signal derives.

8. The combination of a radio identification system, including an interrogating transmitter for transmitting an interrogating signal, and at least one transponder as claimed in claim 1 arranged in use to be carried by a respective target, for transmitting a reply signal in response to said interrogating signal, with a primary radar location system, including a primary radar transmitter for transmitting a primary radar signal delayed with respect to the transmission of the interrogating signal by an amount equal or corresponding to the fixed overall time delay introduced by the transponder, the combination further including receiver means for receiving and coordinating the reply signal transmitted by the transponder in response to the interrogating signal transmitted by the interrogating receiver, and the primary radar return signal received from the target in response to said primary radar signals.

* * * * *